United States Patent [19]

Campbell

[11] Patent Number: 4,980,415

[45] Date of Patent: Dec. 25, 1990

[54] COMPOSITIONS COMPRISING POLYPHENYLENE ETHERS AND REACTIVE GRAFT POLYMERS

[75] Inventor: John R. Campbell, Clifton Park, N.Y.

[73] Assignee: General Electric Company, Schenectady, N.Y.

[21] Appl. No.: 345,868

[22] Filed: May 1, 1989

[51] Int. Cl.$^5$ .................... C08L 51/06; C08L 71/12
[52] U.S. Cl. .................... 525/68; 525/319; 525/322; 525/324; 525/905
[58] Field of Search .................... 525/68, 905

[56] References Cited

U.S. PATENT DOCUMENTS 4,604,415  8/1966  Hambrecht et al. .................. 525/68

*Primary Examiner*—Jacob Ziegler
*Attorney, Agent, or Firm*—William H. Pittman; James C. Davis, Jr.

[57] ABSTRACT

Compositions comprising polyphenylene ether copolymers are prepared by blending, preferably in the melt, a functionalized polyphenylene ether with a graft polymer, which is in turn prepared by the free radical reaction of a base polymer such as polyethylene or polypropylene with an olefinic compound containing a tertiary alkyl ester group, which may be a simple carboxylic acid or a carbamic acid ester group. The t-butyl groups are removed by thermal degradation under the reaction conditions to yield a carboxylic acid- or amino-functionalized graft polymer which reacts with the polyphenylene ether.

12 Claims, No Drawings

COMPOSITIONS COMPRISING POLYPHENYLENE ETHERS AND REACTIVE GRAFT POLYMERS

This invention relates to the compatibilization of blends of polyphenylene ethers with other polymers, and more particularly to the use for that purpose of polyphenylene ether copolymers with graft polymers containing reactive functional groups.

Blends of polymers derived from olefinically unsaturated monomers with other polymers frequently have advantageous properties as compared with the individual polymeric constituents. For example, polyphenylene ethers are known for their high temperature resistance, high melt viscosities and toughness. However, they are somewhat deficient for many uses in such properties as solvent resistance, impact strength and workability.

Such properties of polyphenylene ethers could be improved by blending them with such materials as olefin polymers. Blends of this type are disclosed, for example, in U.S. Pat. Nos. 4,166,055, 4,383,082 and 4,584,334. It is generally required that such blends contain relatively low proportions of olefin polymer, since in higher proportions they become incompatible with the polyphenylene ether and parts molded therefrom are brittle and may undergo delamination.

It is also known that blends of otherwise incompatible polymers may frequently be made compatible by incorporating therein said copolymer of the constituents of the blend. Copolymer-containing polyphenylene ether compositions of this general type are disclosed, for example, in U.S. Pat. No. 4,600,741 (carboxy-substituted polyphenylene ethers and polyamides) and in PCT application No. 87/7279 and copending, commonly owned applications Ser. No. 122,480, filed Nov. 10, 1987, and Ser. No. 07/351,905, (carboxy- and epoxy-substituted polyphenylene ethers and polyesters), the disclosures of which are incorporated by reference herein. Copolymer formation generally requires the presence on both polymers of interreactive groups such as carboxylic acid, epoxy and/or amide groups, which may be provided in the case of polyphenylene ethers by reaction with one or more suitable reagents such as trimellitic anhydride acid chloride or terephthaloyl chloride followed by glycidol.

Olefin polymers containing, for example, carboxylic acid moieties, which are capable of reaction with epoxy-functionalized polyphenylene ethers and the like, are known in the art. They are generally copolymers of such olefins as ethylene or propylene with acidic monomers such as acrylic or methacrylic acid. However, the proportion of acidic groups therein is often much too high for effective copolymer formation with retention of the properties of the olefin polymers. Moreover, olefin polymers containing, for example, amino groups which can react with carboxylic acid groups on other polymers are, for the most part, unavailable since unsaturated amines "trap" free radicals formed by the action of radical initiators, acting as chain terminators for the polymerization reaction.

The present invention provides a novel class of polyphenylene ether copolymers with addition polymers of olefinically unsaturated monomers, prepared from graft polymers containing protected amine or carboxy moieties. Said moieties are capable of conversion under high-temperature blending conditions to free amino or carboxy groups, which are in turn capable of undergoing reaction with reactive groups on the polyphenylene ether, facilitating copolymer formation.

The invention is a composition comprising the product of blending, at a temperature in the range of about 225°–350° C.;

(A) a graft copolymer comprising molecules having:
   a base polymer chain consisting essentially of structural units derived from an olefinically unsaturated hydrocarbon which is unsubstituted or contains substantially non-reactive substituents, and
   grafted moieties thereon having the formula

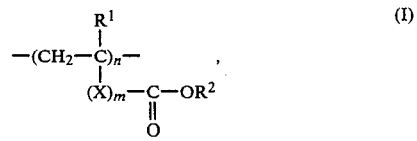

wherein:
X is —NH—, an alkylene radical containing about 1–4 carbon atoms or an arylene radical containing about 6–10 carbon atoms;
$R^1$ is hydrogen, halogen, an alkyl radical containing about 1–4 carbon atoms or an aryl radical containing about 6–10 carbon atoms;
$R^2$ is a tertiary alkyl radical containing about 4–10 carbon atoms;
m is 0 or 1; and
n has an average value from 1 to about 5; and
(B) a polyphenylene ether containing functional groups reactive with carboxylic acid or amine moieties.

The base chains in the graft polymers used as reagent A according to the invention are conventionally derived from such monomers as ethylene, propylene, isobutene, styrene, butadiene, isoprene, chloroprene, vinyl chloride or vinylidene chloride. They may be homopolymers or copolymers, amorphous or crystalline. Polyethylene and polypropylene homopolymers, the former including high density, low density and linear low density polyethylene, are often preferred.

The grafted moieties have formula I. In that formula, $R^1$ may be hydrogen, halogen, alkyl or aryl as defined hereinabove and is most often hydrogen or methyl. $R^2$ is a tertiary alkyl group as described and is most often t-butyl.

Included are polymers in which m is 0 or 1; that is, the X value may be present or absent. When present, it may be an —NH— group or an alkylene or arylene radical as defined. In the preferred graft copolymers, m is 0 or m is 1 and X is —NH—.

The average value of n is from 1 to about 5. It is usually about 1–2, with a value of about 1 being preferred.

The graft polymers useful as reagent A are disclosed and claimed in copending, commonly owned application Ser. No. 07/473,127. They may be prepared by free radical addition of a corresponding olefinic compound to a polymer corresponding to the base polymer chain. Such addition may take place under any suitable conditions for free radical reactions of this type. Thus, bulk or solution addition reactions are acceptable. It is frequently advantageous to conduct the reaction in the melt, in conventional melt reaction equipment such as an extruder.

Any suitable temperature for a free radical addition reaction up to about 225° C. may be employed. Above about 200° C., the maximum reaction time should be about 5 minutes since longer times may cause some degree of thermal degradation of the product. Thermal degradation predominates at temperatures above about 225° C. The preferred reaction temperature is in the range of about 150°–200° C.

It is generally advantageous to employ a free radical initiator in the preparation of the graft polymers. Any initiator which will generate free radicals at the reaction temperatures employed may be used. Suitable initiators are known in the art; they include dicumyl peroxide, 2,5-dimethyl- 2,5-bis(t-butylperoxy)hexane and 2,5-dimethyl-2,5-bis(t-butylperoxy)-3-hexyne.

The proportion of olefinic reactant used will depend on the intended purpose of the graft polymer and the degree of functionalization desired. In general, said proportion is up to about 5% and preferably about 2–3% by weight of the base polymer, whereupon the graft copolymer is functionalized in about the same proportion.

The preparation of graft polymers useful as reagent A is illustrated by the following examples. All parts and percentages are by weight.

EXAMPLES 1–4

Dry blends of a commercially available linear low density polyethylene and a free radical initiator were extruded on a single-screw extruder at 175° C. and 400 rpm., as t-butyl methacrylate was introduced by syringe pump into the extruder throat to provide 3% thereof by weight based on polyethylene. The extrudates were analyzed by Fourier transform infrared spectroscopy, dissolved in xylene, reprecipitated and again analyzed to determine the degree of grafting.

The results are given in Table I. Initiator percentages are based on polyethylene. The initiators are identified as follows:
"Hexane"—2,5-dimethyl-2,5-bis(t-butylperoxy)hexane.
"Hexyne"—2,5-dimethyl-2,5-bis(t-butylperoxy)-3-hexyne.

TABLE I

| Example | Initiator Identity | % | % grafting |
|---|---|---|---|
| 1 | Hexyne | 0.1 | 30 |
| 2 | Hexyne | 0.2 | 50 |
| 3 | Hexyne | 0.3 | 65 |
| 4 | Hexane | 0.3 | 50 |

EXAMPLES 5–8

Dry blends of the polyethylene of Example 1, radical initiator and t-butyl allylcarbamate were extruded, analyzed and reprecipitated as described in Example 1 and in the same proportions. The results are given in Table II.

TABLE II

| Example | Initiator Identity | % | % grafting |
|---|---|---|---|
| 5 | Hexyne | 0.1 | 36 |
| 6 | Hexyne | 0.2 | 52 |
| 7 | Hexyne | 0.3 | 70 |
| 8 | Hexane | 0.3 | 50 |

Infrared spectroscopic analysis of the product of Example 7 showed the presence of a pronounced ester carbonyl peak at 1725 cm.$^{-1}$. Upon heating to 230° C. and pressing a film of the heat product for five minutes at 250° C., a thermally degraded polymer containing no ester carbonyl peak was obtained.

The graft polymers undergo thermal degradation at relatively high temperatures, with the elimination of olefin and, when X is —NH—, carbon dioxide, to yield carboxy- or amino-substituted polymers. The latter are capable of reaction with other polymers containing various functional groups. In particular, they react with functionalized polyphenylene ethers to form the compositions of this invention.

Reagent B is a polyphenylene ether containing functional groups reactive with the carboxylic acid or amine moieties of reagent A. The polyphenylene ethers from which reagent B is derived are a well known class of polymers. They are widely used in industry, especially as engineering plastics in applications requiring toughness and heat resistance. Since their discovery, they have given rise to numerous variations and modifications all of which are applicable to the present invention, including but not limited to those described hereinafter.

The polyphenylene ethers comprise a plurality of structural units having the formula

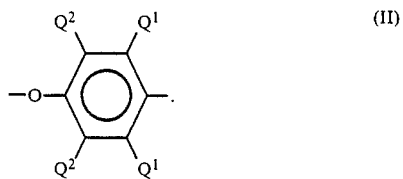

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of primary lower alkyl groups suitable as $Q^1$ and $Q^2$ are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent, provided substantial proportions of free hydroxy groups remain present. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

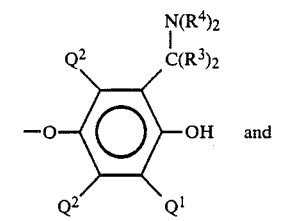

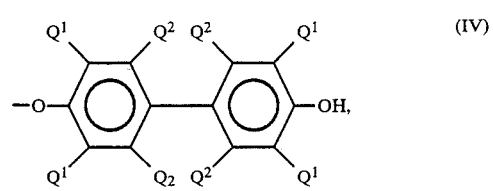

wherein $Q^1$ and $Q^2$ are as previously defined; each $R^3$ is independently hydrogen or alkyl, with the proviso that the total number of carbon atoms in both $R^3$ radicals is 6 or less; and each $R^4$ is independently hydrogen or a $C_{1-6}$ primary alkyl radical. Preferably, each $R^3$ is hydrogen and each $R^4$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radials. The principal site of reaction is the $Q^1$ radical adjacent to the hydroxy groups on the terminal unit of the polymer chain. During further processing and/or blending, the aminoalkyl-substituted end groups may undergo various reactions, probably involving a quinone methide-type intermediate of the formula

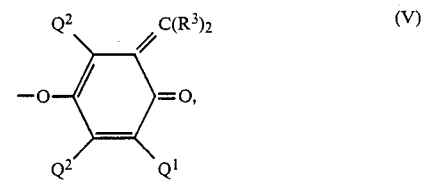

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

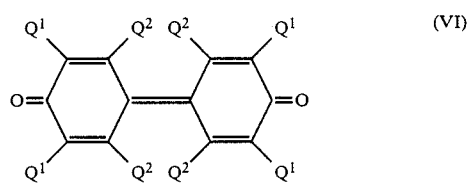

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by wight of the polymer, contain end groups having one or frequently both of formulas III and IV. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use to prepare reagent B include all those presently known, irrespective of variations in structural units or ancillary chemical features.

Suitable functional groups on reagent B, which are capable of reacting with the carboxy or amino groups formed by thermal degradation, as described hereinabove, of the

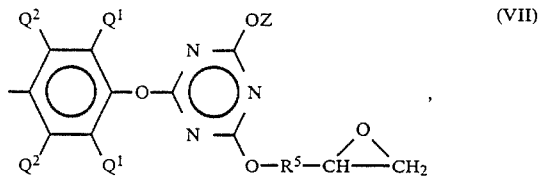
(VII)

moieties of reagent A, include epoxy and carboxy groups. They may be incorporated in the polyphenylene ether by various methods known in the art, including those described in the aforementioned patent and applications incorporated herein by reference.

A particularly useful class of functionalized polyphenylene ethers for the purposes of the present invention, disclosed and claimed in the aforementioned copending application Ser. No. 07/473,127, is the epoxytriazine-capped polymers having end groups of the formula

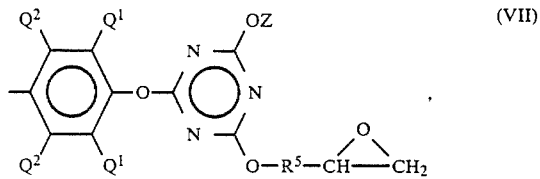
(VII)

wherein Z is an alkyl, cycloalkyl or aromatic radical or

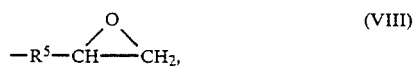
(VIII)

$R^5$ is a divalent aliphatic, alicyclic, heterocyclic or unsubstituted or substituted aromatic hydrocarbon radical, and $Q^1$ and $Q^2$ are as previously defined. The Z values therein may be alkyl or cycloalkyl radicals, typically lower alkyl and especially primary or secondary lower alkyl; aromatic radicals, typically monocyclic and containing 6–10 carbon atoms and especially aromatic hydrocarbon radicals; or a radical of formula VIII. In formulas VII and VIII, $R^5$ may be aliphatic, alicyclic, aromatic (including aromatic radicals containing art-recognized substituents) or heterocyclic. It is usually lower alkylene and especially methylene.

The above-described epoxytriazine-capped polyphenylene ether compositions may be prepared by contacting under reactive conditions, in the presence of a basic reagent, at least one polyphenylene ether with an epoxychlorotriazine of the formula

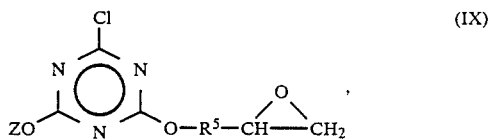
(IX)

wherein $R^5$ and Z are as previously defined.

Typical epoxychlorotriazines of formula IX include 2-chloro-4,6-diglycidoxy-1,3,5-triazine (hereinafter "DGCC"), 2-chloro-4-(n-butoxy)-6-glycidoxy-1,3,5-triazine (hereinafter "BGCC") and 2-chloro-4-(2,4,6-trimethylphenoxy)-6-glycidoxy-1,3,5-triazine (hereinafter "MGCC"). These compounds may also be named as though derived from cyanuric acid and designated diglycidyl chlorocyanurate, n-butyl glycidyl chlorocyanurate and 2,4,6-trimethylphenyl glycidyl chlorocyanurate, respectively. They may be prepared, for example, by the reaction of 2,4,6-trichlorotriazine (cyanuric chloride) with glycidol or combinations thereof with n-butanol or mesitol. Cyanuric chloride and n-butyl dichlorocyanurate are both commercially available.

Intermediates such as DGCC, BGCC and MGCC and the method for their preparation are disclosed and claimed in copending, commonly owned application Ser. No. 144,901, filed Jan. 19, 1988, now U.S. Pat. No. 4,895,945. Their preparation is illustrated by the following example, all parts and percentages in the examples herein are by weight unless otherwise indicated.

EXAMPLE 9

To a mechanically stirred solution of 220.8 g. (1.2 moles) cyanuric chloride in 1500 ml. chloroform, cooled to 0°–10° C., was added 266.4 g. (3.6 moles) glycidol in one portion. Aqueous sodium hydroxide (50% solution; 192 g.) was added to the mixture dropwise with stirring over about 3 hours maintaining the reaction temperature below 10° C. and preferably around 0°–5° C. The reaction mixture was allowed to warm slowly to room temperature. The chloroform layer was washed with distilled water until neutral and dried over magnesium sulfate. The reaction product was found by carbon-13 nuclear magnetic resonance to be 2-chloro-4,6-diglycidoxy-1,3,5-triazine (DGCC). Analysis by liquid chromatography showed about 95% (by weight) chlorodiglycidoxytriazine. The reaction mixture also was found to contain small amounts of triglycidoxytriazine and dichloroglycidoxytriazine.

EXAMPLE 10

To a magnetically stirred solution of 250 g. (1.125 moles) n-butyl dichlorocyanurate in 757 ml. chloroform, cooled to 0°–10° C., was added 250 g. (3.375 moles) glycidol in one portion. Aqueous sodium hydroxide (50% solution; 90 g.) was added to the mixture dropwise with stirring over about 2 hours, maintaining the reaction temperature below 10° C. and preferably around 0°-5° C. The reaction mixture was allowed to warm to room temperature over 30 minutes. The chloroform layer was washed with distilled water until neutral and dried over magnesium sulfate. Proton nuclear magnetic resonance analysis indicated a 95% yield of 2-chloro-4-(n-butoxy)-6-glycidoxy-1,3,5-triazine (BGCC).

EXAMPLE 11

To a mechanically stirred solution of 50 g. (0.175 mole) 2,4,6-trimethylphenyl dichlorocyanurate (prepared by the reaction of equimolar amounts of mesitol and cyanuric chloride) in 170 ml. methylene chloride, cooled to 0°-10° C., was added 26.38 g. (0.356 mole) glycidol in one portion. Aqueous sodium hydroxide (50% solution; 14.26 g.) was added to the mixture dropwise with stirring over about 25 minutes maintaining the reaction temperature between 0° and 10° C. and preferably around 0°-5° C. After stirring an additional 30 minutes, the reaction mixture was allowed to warm to room temperature. The methylene chloride layer was washed with distilled water until neutral and dried over magnesium sulfate. The reaction product was found by proton nuclear magnetic resonance to be 2-chloro-4-(2,4,6-trimethylphenoxy)-6-glycidoxy-1,3,5-triazine (MGCC).

Various options are available for the reaction of the polyphenylene ether with the epoxychlorotriazine. In one method, the reaction is conducted in solution in a non-polar organic liquid, typically at a temperature in the range of about 80°-150° C. and preferably about 100°-125° C. The basic reagent employed in this method should be soluble in the organic liquid and is generally a tertiary amine. Its identity is not otherwise critical, provided it is sufficiently non-volatile to remain in the reaction mixture at the temperatures employed. Pyridine is often preferred.

The amount of epoxychlorotriazine employed in this option is generally in the range of about 1–20% by weight, based on polyphenylene ether. The amount of basic reagent is an effective amount to promote the reaction; in general, about 1.0–1.1 equivalent thereof per mole of chloroepoxytriazine is adequate.

The epoxytriazine-capped polyphenylene ethers made in solution by the above-described process are generally found to contain rather high proportions (e.g., at least about 0.4% by weight) of chemically combined chlorine, principally covalently bound. It is believed that the covalently bound chlorine is the result of epoxy groups competing with the organic base as a hydrogen chloride acceptor, with the formation of chlorohydrin moieties. This may be followed by condensation of said chlorohydrin moieties with additional epoxy groups to produce such molecular species as polyphenylene ether-epoxytriazine block copolymers and homopolymeric epoxytriazine oligomers.

Upon molding, compositions containing polyphenylene ether copolymers prepared from products containing such species form articles which are ductile but have impact strengths somewhat lower than desired under certain conditions. This is particularly true of copolymers with polyesters.

A second preferred method of preparation produces epoxytriazine-capped polyphenylene ethers with little or no covalently bound chlorine. In this method, the reaction is conducted interfacially in a medium comprising water and an organic liquid as previously described. The basic reagent is a water-soluble base, typically an alkali metal hydroxide and preferably sodium hydroxide. It may added to the mixture of epoxychlorotriazine and polyphenylene ether, or may initially react with the polyphenylene ether to form a salt which is then contacted with the epoxychlorotriazine. There is also employed a phase transfer catalyst. Any of such catalysts which are stable and effective under the prevailing reaction conditions may be used; those skilled in the art will readily perceive which ones are suitable. Particularly preferred are the tetraalkylammonium chlorides wherein at least two alkyl groups per molecule, typically 2 or 3, contain about 5–15 carbon atoms.

In this method, reaction temperatures in the range of about 20°–100° C. may be employed. The amount of epoxychlorotriazine is frequently lower than in the previously described method, typically in the range of about 1–6% and preferably about 2–6% by weight based on polyphenylene ether, since the reaction of the epoxychlorotriazine with the polyphenylene ether apparently proceeds more nearly to completion. Most often, the ratio of equivalents of base to moles of epoxychlorotriazine is about 0.5–1.5:1, and the weight ratio of phase transfer catalyst to base is about 0.01–0.3:1.

Still another method utilizes an organic liquid and a solid base, typically a solid alkali metal hydroxide or an anion exchange resin in the free base form. Chloride salts may be removed by methods known in the art, including water washing when a hydroxide is employed and filtration when an anion exchange resin is employed.

Regardless of which method of preparation is used, the epoxytriazine-capped polyphenylene ether may be isolated by conventional methods, typically by precipitation with a non-solvent. Among the non-solvents which may be employed are methanol, 1-propanol, acetone, acetonitrile and mixtures thereof. When the non-solvent is an alcohol, and especially methanol, it may undergo base-promoted reaction with the epoxytriazine moieties on the capped polyphenylene ether, usually resulting in a loss of epoxide groups. Either or both of two operations may be employed to suppress this reaction. The first is to neutralize the reaction mixture with any convenient acidic compound; carbon dioxide, in gaseous, liquid or solid form, is often preferred. The second is to remove alcohol from contact with the product as rapidly and completely as possible by conventional means, typically including a subsequent drying step.

In the following examples which illustrate the preparation of epoxytriazine-capped polyphenylene ethers, proportions of epoxychlorotriazine are expressed as a percentage of polyphenylene ether. The following polyphenylene ethers were employed:

PPE—a poly(2,6-dimethyl-1,4-phenylene ether) having an intrinsic viscosity in chloroform at 25° C. of 0.40 dl./g.

VV—PPE which had been extruded on a twin screw extruder within the temperature range of about 260°–320° C., with vacuum venting to a maximum pressure of about 20 torr.

LN—a poly(2,6-dimethyl-1,4-phenylene ether) having an intrinsic viscosity of 0.57 dl./g., having a low proportion of nitrogen as a result of preparation with a catalyst containing no primary or secondary amine. Percentages of epoxytriazine in the capped polymer were determined from the relative areas of peaks in the nuclear magnetic resonance spectrum attributable to hydrogen atoms in the epoxy and aromatic moieties. Chlorine percentages were determined by quantitative X-ray fluorescence.

EXAMPLES 12-22

To solutions of 400 grams of polyphenylene ether in 2500 ml. of toluene were added, with stirring, various quantities of pyridine followed by various quantities of epoxychlorotriazines, added in portions. The ratio of equivalents of pyridine to moles of epoxychlorotriazine was 1.04:1. The solutions were heated under reflux for various periods of time, after which the products were precipitated with methanol in a blender, filtered, washed with methanol and vacuum dried. The relevant parameters and analytical results are given in Table I.

TABLE I

| Example | Polyphenylene ether | Epoxychlorotriazine Identity | % | Reaction time, hrs. | % epoxytriazine | % chlorine |
|---|---|---|---|---|---|---|
| 12 | PPE | DGCC | 5 | 2 | 0.52 | — |
| 13 | PPE | DGCC | 5 | 3 | 0.62 | — |
| 14 | VV  | DGCC | 5 | 1 | 0.43 | 0.42 |
| 15 | VV  | DGCC | 5 | 2 | 0.65 | — |
| 16 | VV  | DGCC | 5 | 3 | 0.63 | 0.47 |
| 17 | VV  | DGCC | 2.5 | 3.5 | 0.24 | — |
| 18 | VV  | DGCC | 15 | 3 | 2.1 | 1.8 |
| 19 | VV  | DGCC | 15 | 3 | 1.9 | — |
| 20 | VV  | BGCC | 5 | 3 | 0.50 | — |
| 21 | VV  | BGCC | 5 | 3 | 0.40 | — |
| 22 | VV  | BGCC | 15 | 3 | 1.79 | — |

EXAMPLES 23-33

To solutions of 400 grams of polyphenylene ether in 2500 ml. of toluene were added various quantities of epoxychlorotriazines dissolved in a small amount of methylene chloride. There were then added 48 grams of a 10% solution in toluene of a commercially available methyltrialkylammonium chloride in which the alkyl groups contained 8-10 carbon atoms, and 10% aqueous sodium hydroxide solution in the amount of 1.3 equivalents of sodium hydroxide per mole of epoxychlorotriazine. The mixtures were stirred vigorously for various periods at 25°-40° C., after which the products were precipitated with methanol in a blender and rapidly filtered, washed with methanol and vacuum dried.

The results are given in Table II. Chlorine proportions were less than 200 ppm., the minimum detectable by quantitative X-ray fluorescence.

TABLE II

| Example | polyphenylene ether | Epoxychlorotriazine Identity | % | Reaction time, min | % epoxy triazine |
|---|---|---|---|---|---|
| 23 | PPE | DGCC | 1.5 | 30 | 0.52 |
| 24 | PPE | DGCC | 2.0 | 30 | 1.03 |
| 25 | PPE | DGCC | 2.5 | 30 | 0.95 |
| 26 | PPE | DGCC | 3.0 | 30 | 0.96 |
| 27 | PPE* | DGCC | 3.0 | 30 | 1.01 |
| 28** | PPE | DGCC | 3.0 | 30 | 1.24 |
| 29 | LN  | DGCC | 3.0 | 30 | 0.48 |
| 30 | PPE | DGCC | 5.0 | 30 | 1.40 |
| 31 | VV  | DGCC | 5.0 | 10 | 0.68 |
| 32 | PPE | BGCC | 3.0 | 30 | 1.25 |
| 33 | PPE | MGCC | 3.0 | 30 | 1.50*** |

*16% slurry of crude PPE in toluene.
**Reaction mixture neutralized with gaseous carbon dioxide.
***Average of 3 runs.

Reagents A and B may be blended in solution or in the melt, at temperatures typically in the range of about 225°-350° C. Melt blending, especially under extrusion conditions similar except for temperature to those previously described, is often preferred. There is evidence for the formation, at least in part, of polyphenylene ether-addition polymer copolymers as a result of blending under such conditions, and the presence of such copolymers in the compositions of the invention is specifically contemplated.

By reason of the difference in temperatures required for graft polymer (reagent A) formation and copolymer formation according to this invention, it is possible to perform both operations sequentially in a single extruder if the proper temperature gradient is maintained. Thus, it is within the scope of the invention to maintain the first zones of the extruder at a temperature up to about 225° C. and feed thereto the base polymer and olefinic compound, to introduce the functionalized polyphenylene ether through a downstream port and to maintain a higher temperature, typically about 225°-350° C., in the zones following said downstream port.

The preparation of the compositions of this invention is illustrated by the following examples.

EXAMPLE 34

A five-gram sample of the produce of Example 7 was dissolved in xylene, reprecipitated by pouring into methanol and isolated by filtration. A solution of said product and 5 grams of the epoxide-functionalized polyphenylene ether of Example 33 in 200 ml. of 1,2,4-trichlorobenzene was heated for 3 hours at 200°-200° C., cooled and poured into methanol to precipitate the polymeric material. The precipitate was removed by filtration, vacuum dried and exhaustedly extracted with chloroform in a Soxhlet extractor to remove unreacted epoxide-functionalized polyphenylene ether. The residue, comprising copolymer and any unreacted graft polymer, comprised about 28% of total polymer.

EXAMPLE 35

Following the procedure of Example 34, a copolymer was prepared by reaction of the functionalized polyphenylene ether with the product of Example 3. The residue comprised about 25-30% of total polymeric product.

What is claimed is:

1. A composition comprising the product of blending, at a temperature in the range of about 225°-350° C.;

(A) a graft copolymer comprising molecules having:
a base polymer chain consisting essentially of structural units derived from an olefinically unsaturated hydrocarbon which is unsubstituted or contains substantially non-reactive substituents, and
grafted moieties thereon having the formula

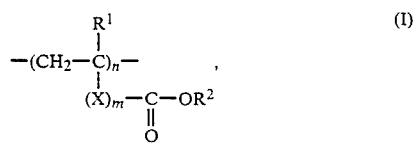

wherein:
X is —NH—, an alkylene radical containing about 1-4 carbon atoms or an arylene radical containing about 6-10 carbon atoms;

$R^1$ is hydrogen, halogen, an alkyl radical containing about 1–4 carbon atoms or an aryl radical containing about 6–10 carbon atoms;

$R^2$ is a tertiary alkyl radical containing about 4–10 carbon atoms;

m is 0 or 1; and n has an average value from 1 to about 5; and (B) a carboxy- or epoxy-functionalized polyphenylene ether.

2. A composition according to claim 1 wherein B comprises a plurality of structural units having the formula

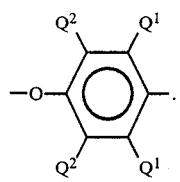  (II)

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A composition according to claim 2 wherein the base chain of A is a polyethylene or polypropylene homopolymer chain.

4. A composition according to claim 3 wherein the grafted moieties on A comprise up to about 5% by weight of the graft polymer.

5. A composition according to claim 4 wherein the polyphenylene ether is a poly(2,6-dimethyl-1,4-phenylene ether).

6. A composition according to claim 5 wherein the average value of n is about 1–2.

7. A composition according to claim 6 wherein $R^2$ is t-butyl.

8. A composition according to claim 7 wherein the base chain of A is a polyethylene chain and the average value of n is about 1.

9. A composition according to claim 8 wherein m is 0.

10. A composition according to claim 8 wherein the grafted moieties on A comprise about 2–3% by weight of the graft polymer.

11. A composition according to claim 8 wherein m is 1 and X is —NH—.

12. A composition according to claim 11 wherein the grafted moieties on A comprise about 2–3% by weight of the graft polymer.

* * * * *